UNITED STATES PATENT OFFICE.

ADOLFO POUCHAIN, OF TURIN, ITALY.

PROCESS OF PREPARING NEGATIVE PLATES FOR ELECTRIC BATTERIES.

1,364,953.     Specification of Letters Patent.     Patented Jan. 11, 1921.

No Drawing.     Application filed September 18, 1919. Serial No. 324,657.

*To all whom it may concern:*

Be it known that I, ADOLFO POUCHAIN, a subject of the King of Italy, and resident of Turin, Italy, have invented certain new and useful Processes of Preparing Negative Plates for Electric Batteries, of which the following is a specification.

This invention relates to a process for the preparation of negative plates of zinc for electric batteries with the object of obtaining plates enabling the use, as the electrolyte of water acidified with sulfuric acid, without said plates being liable to consumption when the circuit is open.

This consumption of the metal which is characteristic of the known batteries of this type is essentially due to the fact that the zinc used for making the negative plates always contains impurities (lead, iron, copper or the like) which have a polarity the opposite to that of zinc and therefore give rise to local couples, the effect of which is to cause the zinc to dissolve in the sulfuric acid. On the other hand, the impurities which the commercial sulfuric acid always contains in sensible proportions (for example copper sulfate) deposit on the zinc even when the latter is pure and also give rise to gradual consumption of the plate.

By the process according to this invention, these inconveniences are avoided by treating the plates so as to insulate the zinc from its impurities and hence exclude the formation of local couples and to coat the surfaces of the zinc with a suitable porous covering for protecting the plates against the deleterious action of an impure electrolyte.

The first result is realized by submitting the zinc plate to a treatment, the effect of which, as may be supposed, is to cover the metal and more particularly the particles of its impurities, with a very thin layer of hydrogen, while the second result is realized by covering the plate with paper, preferably greased, and kept adherent to the plate by coating the latter with a fatty substance.

One manner of carrying out the process according to this invention for the treatment of zinc plates, which may be of any form or thickness, is hereinafter particularly described.

The plate is first amalgamated by any known method, and then is placed in a bath of water slightly acidified with sulfuric acid and containing about 10 per cent. of a solution of magnesium sulfate and mercuric sulfate; thereafter the plate is made a cathode and a current of about 2 amperes per square decimeter is passed. It may be useful to add to the said bath a small proportion of ammonium sulfate.

In any case after the treatment described, which occupies about an hour, the plate is dried at a gentle heat and is then absolutely unattackable, when the circuit is open, by distilled water acidified with pure sulfuric acid, so that by using such zinc plates as negative electrodes in a battery operated with sulfuric acid, there is no loss of zinc while the circuit is open if the sulfuric acid is pure.

To avoid loss due to the action on the zinc of the impurities ordinarily contained in sulfuric acid, the plate is wrapped in a sheet of paper suitably greased to protect it from the action of the acid and made to adhere to the plate itself with aid of a substance which is both adhesive and fatty.

In such manner without sensibly increasing the internal resistance of the battery, the plate is also protected against the injurious action of the impurities in the sulfuric acid, and the batteries formed with the aid of plates of this type, even when they yield a high voltage when the circuit is closed, have no loss of zinc when the circuit is open, so that the battery has a much greater durability than those ordinarily used.

What I claim as my invention and desire to secure by United Stated Letters Patent is:—

1. A process for preparing negative plates for electric batteries consisting in placing an amalgamated plate of zinc in a bath of water slightly acidified with sulfuric acid and containing a salt of magnesium and a salt of mercury, causing this plate to play for a certain time the part of the cathode in the said bath and then drying the plate at a gentle heat.

2. A process for preparing negative plates for electric batteries consisting in placing an amalgamated plate of zinc in a bath of water slightly acidified with sulfuric acid and containing a salt of magnesium and a salt of mercury with a slight addition of ammonium sulfate, causing this plate to play for a certain time the part of the cathode in the said bath and then drying the plate at a gentle heat.

3. A process for preparing negative plates for electric batteries consisting in placing an amalgamated plate of zinc provided with holes in a bath of water slightly acidified with sulfuric acid and containing magnesium sulfate an mercuric sulfate, causing this plate to play for a certain time the part of a negative electrode in the said bath and then drying the plate at a gentle heat.

4. A process for preparing negative plates for electric batteries consisting in placing an amalgamated plate of zinc in a bath of water slightly acidified with sulfuric acid and containing magnesium sulfate and mercuric sulfate, causing this plate to play for a certain time the part of the cathode in the said bath, then drying the plate at a gentle heat and wrapping the zinc plate in an adhering sheet of paper.

5. A process for preparing negative plates for electric batteries consisting in placing an amalgamated plate of zinc in a bath of water slightly acidified with sulfuric acid and containing a salt of magnesium and a salt of mercury, causing this plate to play for a certain time the part of a negative electrode in the said bath, then drying the plate at a gentle heat and applying a wrapping to the zinc plate.

6. A process for preparing negative plates for electric batteries consisting in placing an amalgamated plate of zinc in a bath of water slightly acidified with sulfuric acid and containing a salt of magnesium and a salt of mercury, causing this plate to play for a certain time the part of the cathode in the said bath, then drying the plate at a gentle heat and wrapping the zinc plate in a sheet of paper caused to adhere to the plate by a fatty substance.

Signed at Turin, Italy, this 21st day of August A. D. 1919.

ADOLFO POUCHAIN.